(12) United States Patent
Friederich et al.

(10) Patent No.: US 7,247,099 B2
(45) Date of Patent: Jul. 24, 2007

(54) SCREW WITH A PARTIALLY HARDENED FUNCTIONAL TIP AND PROCESS FOR THE PRODUCTION THEREOF

(75) Inventors: Heinrich Friederich, Gross-Rohrheim (DE); Christof Homrighausen, Bad Berleburg (DE)

(73) Assignee: EJOT GmbH & Co. KG (DE)

( * ) Notice: Subject to any disclaimer, the term of this patent is extended or adjusted under 35 U.S.C. 154(b) by 139 days.

(21) Appl. No.: 10/821,226

(22) Filed: Apr. 8, 2004

(65) Prior Publication Data

US 2004/0235576 A1    Nov. 25, 2004

(30) Foreign Application Priority Data

Apr. 8, 2003    (DE) ................. 103 15 957

(51) Int. Cl.
*B21H 3/02*    (2006.01)
(52) U.S. Cl. ............... 470/8; 470/10; 148/587; 148/643
(58) Field of Classification Search ............ 470/8, 470/9, 10, 17, 199, 204; 148/565, 567, 573, 148/587, 639, 643, 644
See application file for complete search history.

(56) References Cited

U.S. PATENT DOCUMENTS

| | | | |
|---|---|---|---|
| 3,498,352 A | 3/1970 | Duffy | |
| 3,769,103 A | 10/1973 | Wardwell et al. | |
| 3,894,570 A * | 7/1975 | Reynolds | 411/333 |
| 4,021,274 A | 5/1977 | Chadwick | |
| 5,755,542 A | 5/1998 | Janusz et al. | |
| 6,213,884 B1 * | 4/2001 | McCarty | 470/17 |
| 6,364,972 B1 * | 4/2002 | Bauer et al. | 148/587 |
| 6,685,573 B2 * | 2/2004 | Hikosaka et al. | 470/204 |
| 6,855,217 B2 * | 2/2005 | Suzuki | 148/567 |

FOREIGN PATENT DOCUMENTS

| | | |
|---|---|---|
| DE | 2211608 | 5/1972 |
| DE | 22 11 608 A | 10/1972 |
| DE | 198 15 670 A1 | 11/1998 |
| DE | 198 53 733 | 11/1998 |
| DE | 198 53 733 C1 | 2/2000 |
| EP | 0 130 749 | 6/1984 |
| EP | 0 130 749 B1 | 1/1989 |
| JP | 57177922 A | 11/1982 |
| JP | 58083690 | 5/1983 |
| JP | 2002-130417 A | 5/2002 |
| JP | 2000327692 | 5/2002 |

OTHER PUBLICATIONS

European Search Report.
German Office Action.

* cited by examiner

*Primary Examiner*—Ed Tolan
(74) *Attorney, Agent, or Firm*—Altera Law Group, LLC

(57) ABSTRACT

In a process for the production of a screw comprising a low-alloy carbon steel, having a head, an adjoining holding portion and a functional tip which, in the outer region of limited radial depth, is of a greater hardness than the holding portion, in which the screw body is shaped by pressing and rolling and then the functional tip is subjected to a hardening operation, hardening is effected by momentary heating with a high level of energy transfer and subsequent quenching and is limited to portions of the periphery of the functional tip.

15 Claims, 2 Drawing Sheets

Figure 10:
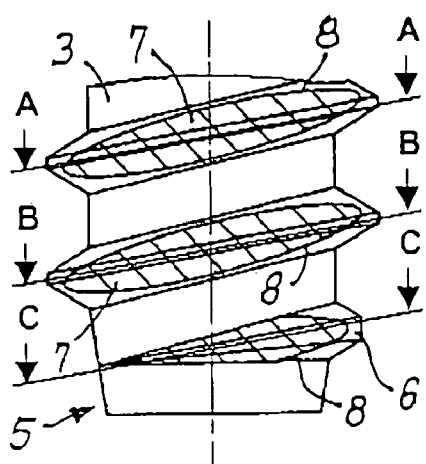

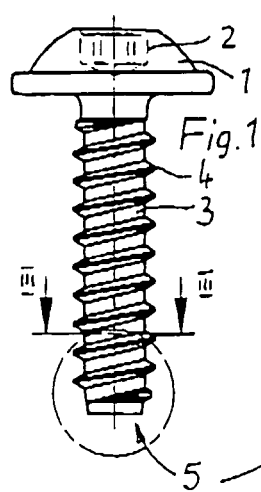 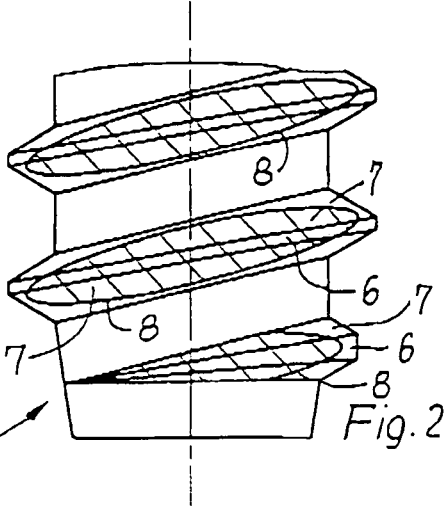 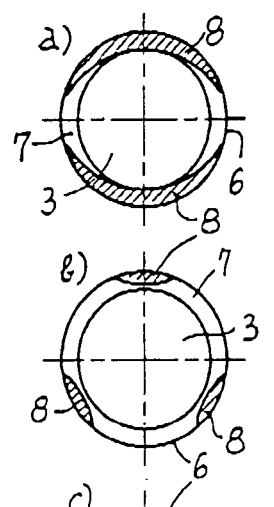
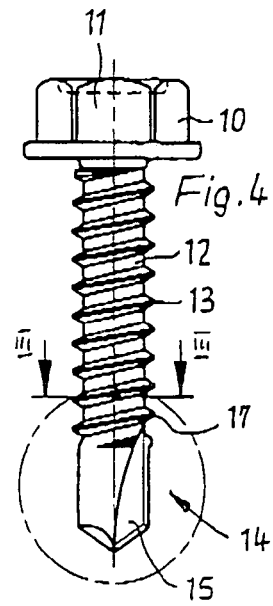 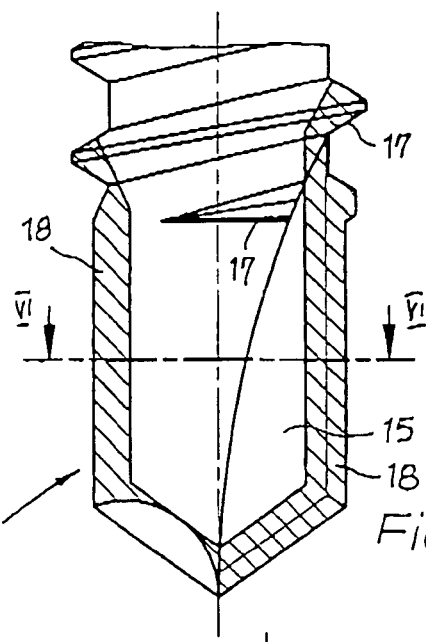 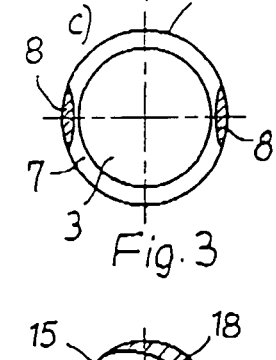 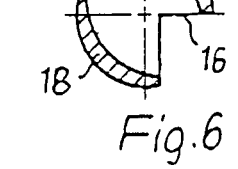
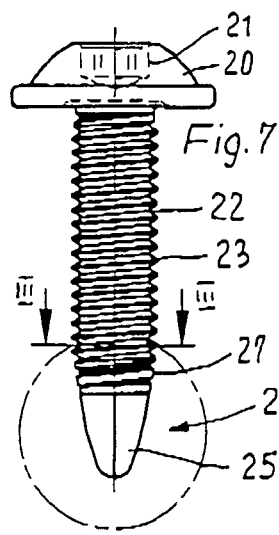 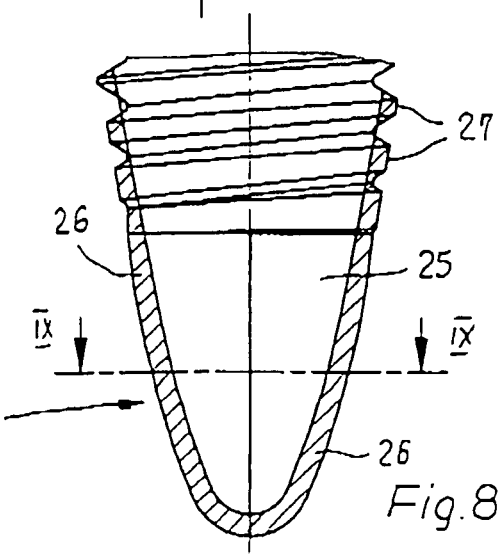 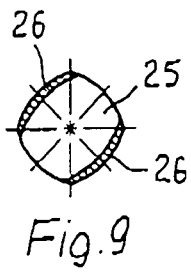

Schnitt A - A

Schnitt B - B

Schnitt C - C

SCREW WITH A PARTIALLY HARDENED FUNCTIONAL TIP AND PROCESS FOR THE PRODUCTION THEREOF

The invention concerns a process for the production of a screw comprising a low-alloy carbon steel, having a head, an adjoining holding portion and a functional tip which, in the outer region of limited radial depth, is of a greater hardness than the holding portion, wherein the screw body is shaped by pressing and rolling and then the functional tip is subjected to a hardening operation. The invention further concerns such a screw.

For production of the self-tapping screw which is known from German patent specification No 22 11 608 and in which the greater screwthread hardness is limited to the self-tapping portion and extends into the screwthread core, the hardened screwthread zone is produced by heating in an induction coil and subsequent quenching. It is only in that way that it is possible to achieve the hardness which the state of the art aims to attain and which is uniform around the periphery. That however results in an intermittent operating procedure with complicated manipulation operations for each individual screw. Therefore the energy transfer rate also falls short of what is possible and in addition additional hardening of the core occurs in the outer region thereof as a result of heat conduction, although core hardening caused by pressing of the head and rolling of the thread is sufficient and the additional hardening effect increases the hydrogen-induced brittle fracture susceptibility of the screw. Finally, the hardened zone is also comparatively long in the axial direction; however because the hardened zone is not to remain in the component to be held but must be screwed through and sticks out, a functional tip which is long in the axial direction particularly spoils the appearance.

It is this that the present invention seeks to remedy. Based on the process set forth in the opening part of this specification, the invention provides that hardening is effected by momentary heating with a high level of energy transfer and subsequent quenching and is limited to portions of the periphery of the functional tip. Those measures are based on the realisation that the action of the functional tip of the screw is not adversely affected in practice if the hardness thereof does not extend over its entire periphery but only over portions of its periphery, while other peripheral portions of the functional tip retain their basic strength. At the same time, that affords the possibility of implementing such a hardening operation in a continuous pass-through process, which makes the production procedure substantially easier and cheaper. Also, the hardening effect can be concentrated on a short lengthwise portion of the screwthread so that in the installed condition only a correspondingly short functional tip protrudes.

Short-term austeniting of low-alloy carbon steel for partial hardening of certain component portions is known per se but not the above-described particular manner of applying such a measure.

The operation of heating the functional tip over portions of the periphery thereof can be effected inductively with a linear transverse advance movement of the screw through a line inductor. It is particularly advantageous however—because of the even faster energy transfer and correspondingly lower level of heat conduction towards the screw core—to utilise the action of a laser beam. In that case a plurality of laser beams can be directed on to peripheral portions of the functional tip of the screw.

Local laser hardening is also known per se, as can be seen for example from DE 198 53 733 C1 or EP 0 130 749 B1, but not in relation to screws and in the particular configuration of the present process.

Prior to partial hardening of the functional tip the screw body can be overall heat-treated or case-hardened. The heat treatment is effected by heating to the austeniting temperature, quenching and tempering, while case-hardening is effected by carburisation or carbonitriding during heating to the austeniting temperature, followed once again by quenching and tempering.

Preferably the peripherally restricted hardening effect is restricted radially to the tips and to flank portions of the screwthread-forming screw flights of the functional tip. If the functional tip also has cutting edges for pre-boring or for flow hole forming, the hardening effect is advantageously limited to the cutting edges of the bore hole-forming portions of the functional tip. In all cases the radial depth of the momentary heating which causes the increased hardening effect can advantageously be reduced in the axial direction from the beginning of the functional tip towards the head.

Accordingly the subject-matter of the invention is also a screw comprising a low-alloy carbon steel, having a head, an adjoining holding portion and a functional tip which, in the outer region of limited radial depth, is of a greater hardness than the holding portion, and which is distinguished in that only peripheral portions of the functional tip are hardened. It is particularly advantageous, not least from the point of view of production engineering, if two diametrally mutually opposite peripheral portions are hardened. However, more specifically when the hardening operation is effected by means of laser beams, it is possible to harden more than two portions which are then distributed uniformly over the periphery of the screw functional tip.

Figure 11:
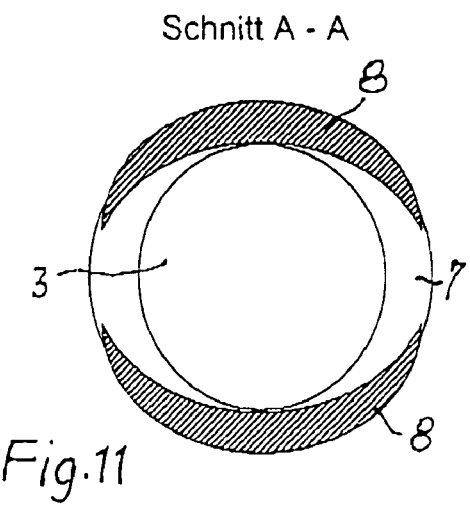
Figure 12:
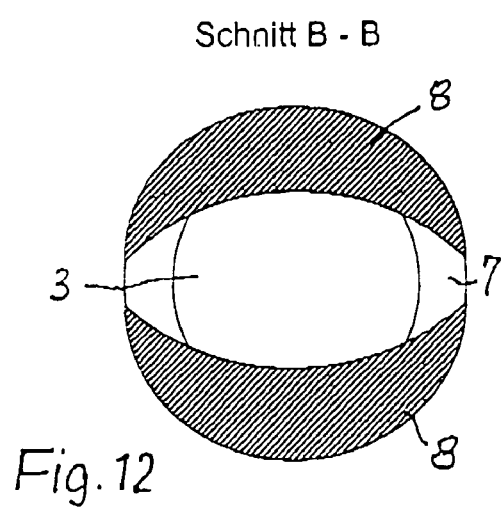
Figure 13:
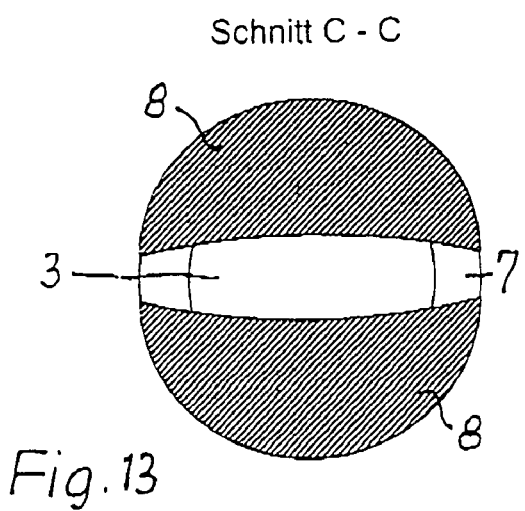

The drawing illustrates the invention by means of embodiments of screws, wherein FIG. 1 shows a side view of a screw with a functional tip serving for forming a screwthread, FIG. 2 shows a view on an enlarged scale of the functional tip marked in FIG. 1, with a hatched indication of hardened screwthread flight regions, FIGS. 3a to c show cross-sectional variants taken on line III-III in FIG. 1 with hardness regions indicated by hatching, FIG. 4 is a side view of another screw with a pre-boring and screwthread-cutting functional tip, FIG. 5 is a view on an enlarged scale of the functional tip emphasised in FIG. 4, with hatched indication of hardness zones, FIG. 6 shows a view in section taken along line VI-VI in FIG. 5, FIG. 7 is a side view of a further screw structure with screwthreaded hole-forming functional tip, FIG. 8 is a view on an enlarged scale of the functional tip emphasised in FIG. 7, with hatched indication of hardness zones, FIG. 9 shows a view in section taken along line IX-IX in FIG. 8, FIG. 10 is a view corresponding to FIG. 2 of a screwthread-forming functional tip with three (partial) screwthread flights, FIG. 11 shows a view in section taken along line A-A in FIG. 10, FIG. 12 shows a view in section taken along line B-B in FIG. 10, and FIG. 13 shows a view in section taken along line C-C in FIG. 10.

The screw shown in FIG. 1 has a head 1 with a tool-engaging recess 2. Its shank 3 is provided with a screwthread 4. The first flight tapers off in the region of the functional tip 5 and, like the two adjoining screwthread flights, is hardened in the manner according to the invention in the region of the tips 6 and flanks 7 over portions 8. FIGS. 3a to c show views in section taken along line III-III in FIG. 1 illustrating hardened peripheral portions 8, the configuration of which, as indicated by hatching, is dependent on the nature of the hardening process used. Thus the portions 8 shown in FIG. 3a are produced by inductive heating with a linear transverse advance movement of the screw through a line inductor while the hardened portions 8 in FIGS. 3b and 3c were produced by heating by means of three and two laser beams respectively.

The screw shown in FIG. 4 has a head 10 with an external tool-engaging configuration 11 and a shank 12 with a screwthread 13. The functional tip 14 thereof has a boring portion 15 with cutting edges 16 and subsequent screwthread-forming screwthread flights 17, the configuration of which corresponds to those of the screw shown in FIG. 1 (see the section on line III-III in FIG. 4). The hardened peripheral portions 18 of the boring portion 15 are to be seen in the view in FIG. 6 in the section on line VI-VI in FIG. 5; the axial extent thereof can be seen directly from FIG. 5.

The screw shown in FIG. 7 has a head 20 with a tool-engaging recess 21. The shank 22 thereof with the screwthread 23 has a functional tip 24 with a hole-forming portion 25, the hardening of which is to be seen in the peripheral portions 26 in FIG. 9. The axial extent of the portions 26 can be seen from FIG. 8. The flights 27 of the screwthread 23, which adjoin the hole-forming tip 25, are again hardened in peripheral portions 8 as was described with reference to FIG. 1 and as can be seen from FIGS. 2 and 3 (see the section on line III-III in FIG. 7).

Advantageously, hardening in accordance with the invention of the functional tip can increase in respect of its radial depth, in an axial direction towards the beginning of the functional tip. As FIG. 13 in conjunction with FIG. 10 shows, it is at its greatest in the region of the first screwthread flight and decreases towards the screw head, in the following screwthread flights (FIGS. 12 and 11). A corresponding consideration also applies to functional tips with boring or flow hole-forming portions (FIGS. 4 and 7 respectively). In that way, the greatest degree of hardness and thus engagement capability of the screw are available at the beginning of the respective working procedure involved.

The invention claimed is:

1. A process for the production of a screw comprising a low-alloy carbon steel, having a head, an adjoining holding portion and a functional tip, said tip having an outer region of limited radial depth, being of a greater hardness than the holding portion,
   wherein the screw body is shaped by pressing and rolling and then the functional tip is subjected to a hardening operation,
   wherein hardening is effected by momentary heating with a high level of energy transfer and subsequent quenching and is limited to portions of the periphery of the functional tip,
   and wherein the radial depth of the momentary heating which causes the increased hardness, is reduced in the axial direction from the beginning of the functional tip towards the head.

2. A process according to claim 1, wherein only diametrically opposed portions of the screw being hardened.

3. A process according to claim 1, wherein the heating operation is effected inductively with a linear transverse advance movement of the screw through a line inductor.

4. A process according to claim 1, wherein the heating operation is effected by means of the action of laser beam.

5. A process according to claim 4, wherein a plurality of laser beams are directed on to a peripheral portion of the functional tip of the screw.

6. A process according to claim 1, wherein prior to hardening of the functional tip the screw body is overall heat-treated (heated to austeniting temperature, quenching and tempering).

7. A process according to claim 1, wherein prior to hardening of the functional tip the screw body is overall case-hardened (heated to austeniting temperature with carburisation or carbonitriding, quenching and tempering).

8. A process according to claim 7, wherein the hardening effect is limited to the tips and flank portions of the screwthread-forming screwthread flights of the functional tip.

9. A process according to claim 7, wherein the hardening operation is limited to the cutting edges of the bore hole-forming portions of the functional tip.

10. A process for the production of a screw body comprising a low-alloy carbon steel having a head, an adjoining holding portion; and a functional tip, said tip having an outer peripheral region of limited radial depth, formed by the process of:
   shaping the screw body by pressing and rolling subjecting the functional tip to a hardening operation comprising momentarily heating with a high level of energy transfer and subsequent quenching limited only to the portions of the outer periphery of the functional tip and further including the step of reducing the momentary heating along the periphery from in an axial direction from the beginning of the functional tip towards the head, so that the hardness is likewise reduced in said axial direction.

11. A process according to claim 10, including the step of hardening diametrically opposed portions of the screw.

12. A process according to claim 10, wherein the heating operation is effected by inductively heating the screw in a linear transverse direction while advancing the screw through a line inductor.

13. A process according to claim 10 wherein, prior to hardening of the functional tip, the screw body is overall heat-treated to austeniting temperature then quenched and tempered.

14. A process according to claim 10, wherein the hardening effect is limited to the tips and flank portions of the screwthread-forming screwthread flights of the functional tip.

15. A process according to claim 10, wherein two diametrically mutually opposite peripheral portions of the functional tip are hardened.

* * * * *